T. KENNEDY AND C. E. KISER.
WATER GLASS LIGHT.
APPLICATION FILED JULY 10, 1919.
1,334,703.
Patented Mar. 23, 1920.
2 SHEETS—SHEET 2.
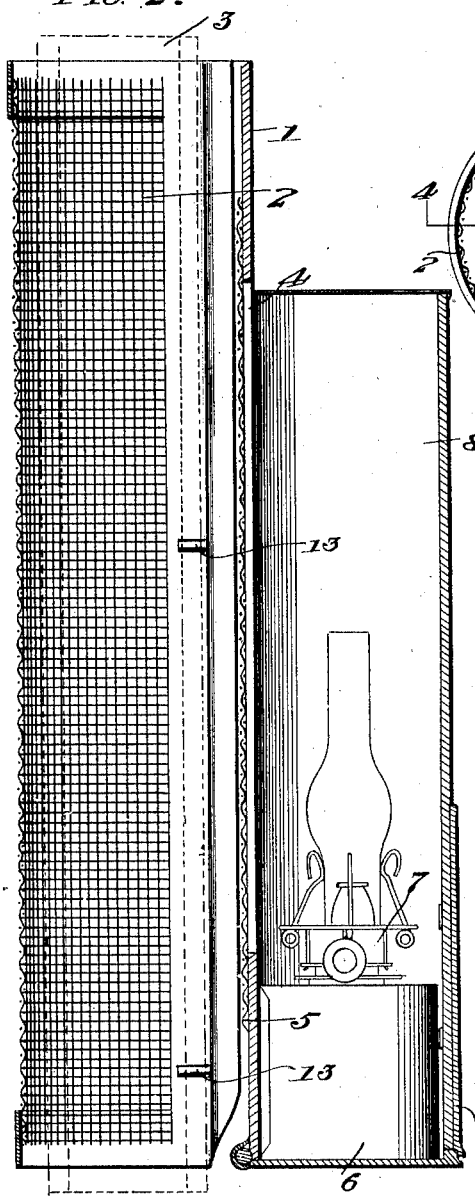
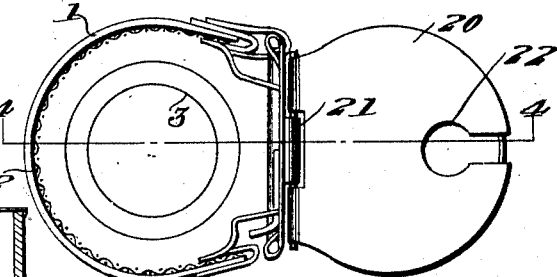
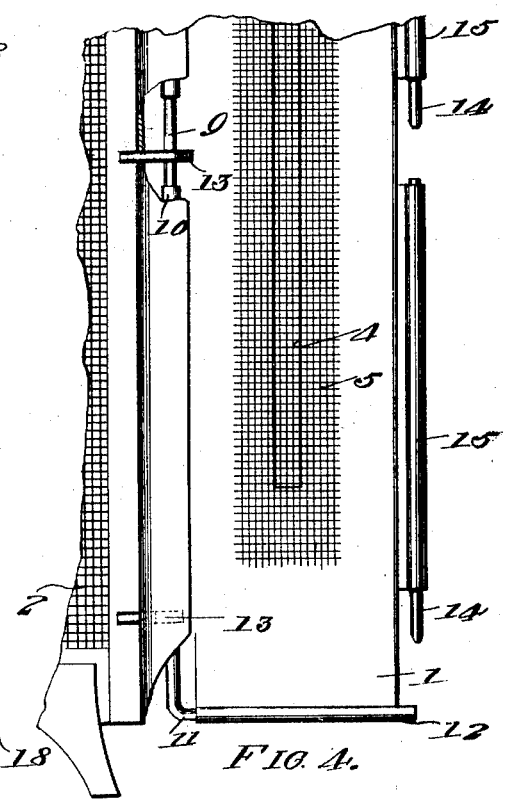
WITNESSES
INVENTORS
THOS. KENNEDY,
C. E. KISER,
BY
ATTORNEYS

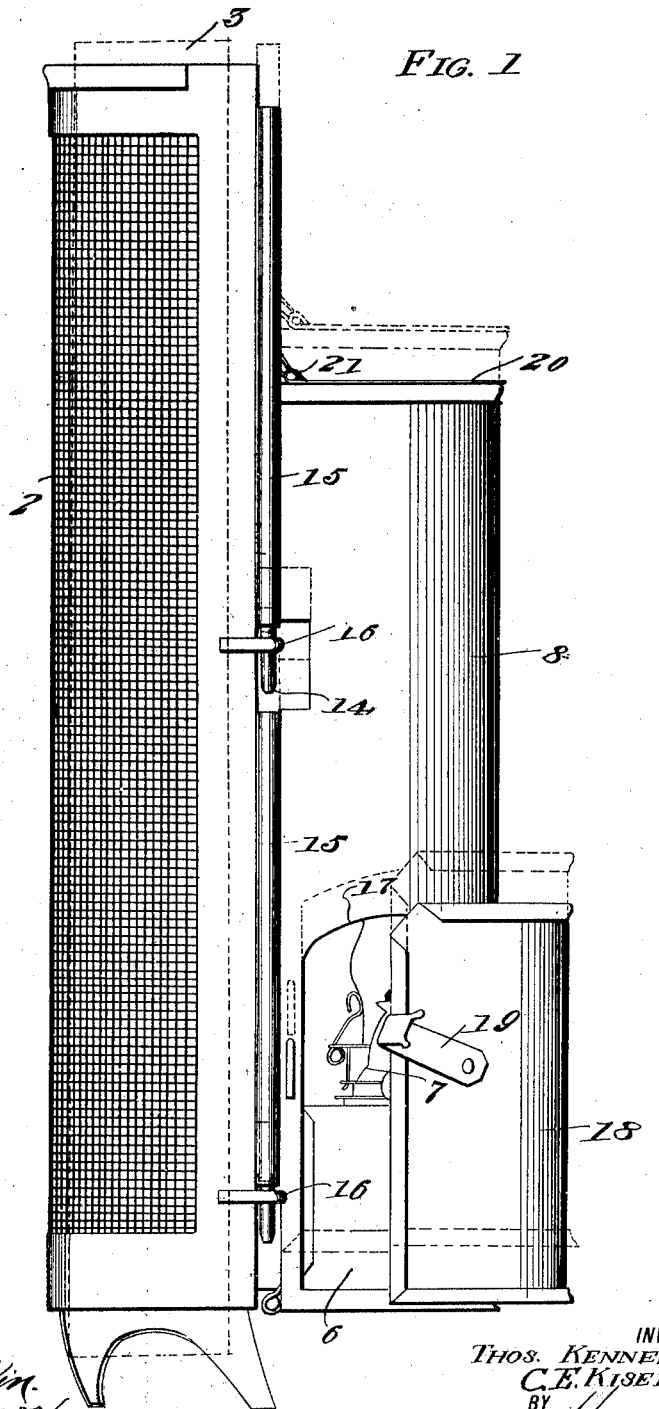

UNITED STATES PATENT OFFICE.

THOMAS KENNEDY AND CHESTER E. KISER, OF NEWTON, KANSAS, ASSIGNORS OF ONE-THIRD TO CHARLES G. LOUD, OF DODGE CITY, KANSAS.

WATER-GLASS LIGHT.

1,334,703.  Specification of Letters Patent.  Patented Mar. 23, 1920.

Application filed July 10, 1919. Serial No. 309,937.

*To all whom it may concern:*

Be it known that we, THOMAS KENNEDY and CHESTER E. KISER, citizens of the United States, and residents of Newton, in the county of Harvey and State of Kansas, have invented certain new and useful Improvements in Water-Glass Lights, of which the following is a specification.

Our invention is an improvement in water glass lights, and has for its object to provide a light of the character specified, adapted to be arranged behind the water glass and to be connected with the back plate of the guard for the glass, wherein the lamp is inclosed in a metal sheath having means for attaching it to the back plate, the back plate having a slot through which the light may shine to illuminate the glass and the water in the glass.

In the drawings:—

Figure 1 is a side view of the improved light,

Fig. 2 is a longitudinal section,

Fig. 3 is a top plan view, and

Fig. 4 is a section on the line 4—4 of Fig. 3.

The present embodiment of the invention is shown in connection with the back plate 1 of the reinforcing screen 2 of the water glass indicated in dotted lines at 3. This screen and back plate are of usual construction, except that the back plate has a vertical slot 4 at its lower end, extending from near the bottom to near the top, and exposing enough of the glass to permit the observer to watch the movement of the water in the glass.

This slot is covered by a sheet 5 of perforate material, as for instance, wire mesh, and the light in the present instance an oil lamp consisting of a body or reservoir 6 and a burner 7, is arranged in an auxiliary casing 8. This casing is hinged to the back plate by means of a rod or pintle 9 which is passed through sleeves 10 on the back plate at one side thereof, and at its lower end the rod has an angular portion 11 which extends through a sleeve 12 on the bottom edge of the back plate.

This rod is slidable vertically in eyes 13 on the screen frame, as well as rotatable in the said eyes. The back plate is held closed to the frame by means of rods 14 which are secured in sleeves 15 on the opposite edge of the back plate from the sleeves 10, and these rods are spaced apart from each other as shown more particularly in Fig. 4, at their adjacent ends.

The rods extend below the sleeves at their lower ends, and they are adapted to engage eyes 16 on the screen frame. It will be understood that the auxiliary casing 8 is secured to the back plate and moves therewith, and it will be obvious that by moving the back plate upward, until the rods 14 are disengaged from the eyes 16, the back plate and the auxiliary casing may be swung away from the screen frame when desired for any purpose.

The light is inserted into the auxiliary casing through a door opening 17, the said opening being normally closed by a door 18 hinged to the auxiliary casing, and having latch mechanism 19 for holding the same closed. The door opening is at the lower end of the auxiliary casing.

The upper end of the auxiliary casing is normally closed by a door 20, which is hinged at 21 to the back plate, and this door has an opening 22 near its free end for permitting the passage of the heated air from the lamp.

It will be obvious that instead of the oil lamp shown any other type of lamp may be used. The improved light is adapted for use in either stationary or locomotive engines, and the fireman standing at the rear of the tender can readily see the water in the glass.

We claim:—

In combination with a water glass and a screen comprising a body and a back plate hinged to the body and having a vertical slot in rear of the glass, an auxiliary casing connected with the back plate and adapted to receive a light to illuminate the water glass, said back plate carrying a rod at one side edge, and the screen carrying eyes at the adjacent side through which the rod is slidable, and having eyes at the opposite side, the back plate having pins for engaging said eyes when the plate is moved downward.

THOMAS KENNEDY.
CHESTER E. KISER.